United States Patent [19]

Ciriello

[11] Patent Number: 4,873,159

[45] Date of Patent: Oct. 10, 1989

[54] BATTERY BLANKET DEVICE

[76] Inventor: Albert Ciriello, 179 S. Windemer Ave., Thunder Bay, Ontario, Canada, P7B-4M7

[21] Appl. No.: 295,135

[22] Filed: Jan. 9, 1989

[51] Int. Cl.⁴ .............................................. H01H 2/02
[52] U.S. Cl. ..................................... 429/120; 429/122
[58] Field of Search .................. 429/120, 122, 163, 48

[56] References Cited

U.S. PATENT DOCUMENTS

| | | | |
|---|---|---|---|
| 3,825,447 | 7/1974 | Kraals | 429/175 |
| 3,859,142 | 1/1975 | Hart | 429/163 |
| 4,054,730 | 10/1977 | Crifasi | 429/120 |
| 4,255,502 | 3/1981 | Taylor, III | 429/163 |
| 4,738,906 | 4/1988 | Sanders | 429/120 |

Primary Examiner—Anthony Skapars

Attorney, Agent, or Firm—Leon Gilden

[57] ABSTRACT

A batttery blanket is set forth particularly in combination with a battery for use in an automotive environment and the like to shield the enclosed battery. The battery blanket includes a porous resilient member configured in a convex relationship to frictionally engage an enclosed battery's exterior with hook and loop fasteners to secure opposed free ends of the battery blanket together. A pocket utilizing a hook and loop fastener enclosing flap includes an associated bottle containing an acid neutralizing liquid for application to the porous lining. An upper terminal end of the battery blanket is formed of a resilient memory retentent material to define a cup-shaped trough including a plurality of openings centrally and longitudinally of the trough for dispensing the neutralizing fluid within the lining.

7 Claims, 1 Drawing Sheet

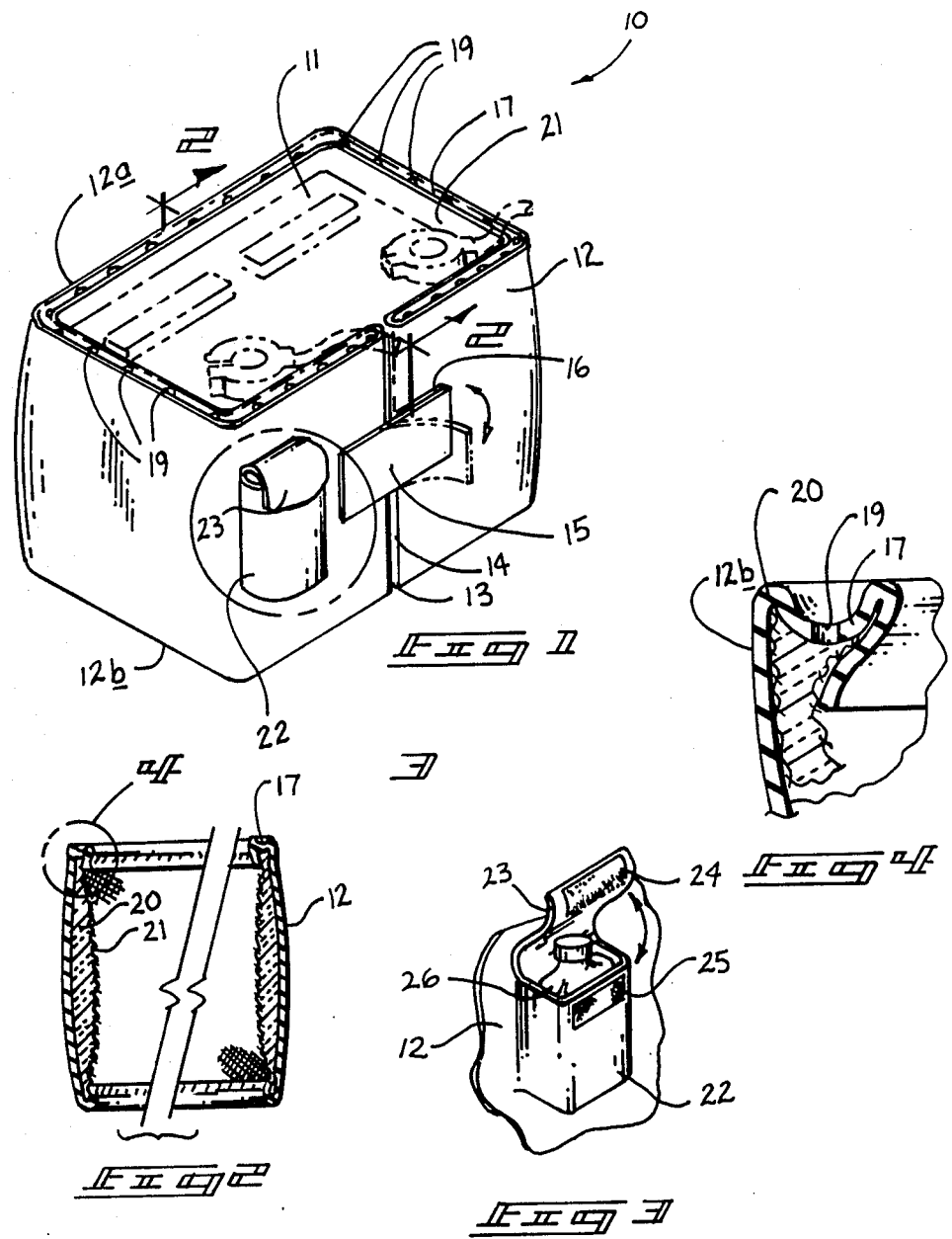

BATTERY BLANKET DEVICE

BACKGROUND OF THE INVENTION

1. Field of the Invention

The field of invention relates to battery protective devices, and more particularly pertains to a new and improved battery blanket wherein the same is provided with a porous lining for dispersing of a battery acid neutralizing solution to the battery.

2. Description of the Prior Art

The use of battery protective devices is well known in the prior art. Batteries in internal combustion environments are typically subject to extremes of elevated and reduced temperatures to lessen effective battery life. Prior art devices include U.S. Pat. No. 4,054,730 to Crifasi setting forth an insulated battery cover of rigid configuration for securement about an associated battery. The battery cover of the Crifasi patent lacks the adaptability for securement about batteries of varying configurations as well as lacking the acid neutralizing applicator liner, as set forth by the instant invention.

U.S. Pat. No. 3,859,142 to Hart sets forth a battery storage compartment closing apparatus wherein the same provides for an impact resistant surrounding layer formed with an absorbing layer and a resealing layer between the absorbing layer and the impact resistant layer for securement about a battery. The Hart patent lacks the acid neutralizing dispensing arrangement of the instant invention, as well as the flexible construction for securement about a range of battery configurations and sizes.

U.S. Pat. No. 4,255,502 to Taylor sets forth a flexible battery cover providing a hinged top overlying enclosed sides for securement about a battery including a fibrous layer for protection of the battery, but as does the prior art, fails to provide for an acid neutralizing and dispensing arrangement for use with the battery as well as a perimeter dimensional adjustment means comprising hook and loop fastener clamp portions to accommodate varying perimeter dimensions of associated enclosed batteries.

U.S. Pat. No. 3,825,447 to Kraals sets forth a battery cover for flexibly enclosing a battery as well as openings for accommodating the battery electrical conductive wires therethrough.

U.S. Pat. No. 4,738,906 to Sanders sets forth a battery containing means including an enclosed heating means for maintaining the temperature of a battery to a predetermined level including insulation means surrounding the battery, but is of a relatively complex and expansive construction, as opposed to the instant invention providing for a battery shielding member of flexible construction for securement about the vertical surface area of the battery as well as an acid neutralizing solution and applicator surface providing an insulative effect to the battery, as set forth by the instant invention.

As such, it may be appreciated that there is a continuing need for a new and improved battery blanket device which addresses both the problems of adaptability to a range of battery sizes and application of an acid neutralizing solution and apparatus therefore to extend the effective life of the enclosed battery.

SUMMARY OF THE INVENTION

In view of the foregoing disadvantages inherent in the known types of battery protective devices now present in the prior art, the present invention provides a battery blanket device wherein the same may be readily secured adjustably about the surface of a battery including acid neutralizing apparatus to extend the effective life of the battery. As such, the general purpose of the present invention, which will be described subsequently in greater detail, is to provide a new and improved battery blanket device which has all the advantages of the prior art battery protective devices and none of the disadvantages.

To attain this, the present invention comprises a battery blanket device wherein the same includes a flexible elongate battery cover formed with companion hook and loop fasteners at opposed free ends for securement of the cover about a battery and further including a flexible trough about an upper perimeter of the blanket of cup-shaped cross-sectional configuration formed with openings longitudinally thereof for dispensing a battery neutralizing solution downwardly through an associated porous sponge-like insulative lining for application of battery acid neutralizing solution to the battery and including a frictional contact surface with the battery case to minimize slippage relative thereto. Further, a pouch including a container of battery acid neutralizing solution contained therein is integrally formed to the exterior surface of the blanket device.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved battery blanket device which has all the advantages of the prior art battery blanket devices and none of the disadvantages.

It is another object of the present invention to provide a new and improved battery blanket device which may be easily and efficiently manufactured and marketed.

It is a further object of the present invention to provide a new and improved battery blanket device which is of a durable and reliable construction.

An even further object of the present invention is to provide a new and improved battery blanket device which is susceptible of a low cost of manufacture with regard to both materials and labor, and which accordingly is then susceptible of low prices of sale to the consuming public, thereby making such battery blanket devices economically available to the buying public.

Still yet another object of the present invention is to provide a new and improved battery blanket device which provides in the apparatuses and methods of the prior art some of the advantages thereof, while simultaneously overcoming some of the disadvantages normally associated therewith.

Still another object of the present invention is to provide a new and improved battery blanket device wherein the same provides for an insulative protective apparatus in surrounding relationship to an associated battery and further includes apparatus for imparting a battery acid neutralizing solution to the exterior surface of the battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken along the lines 2—2 of FIG. 1 in the direction indicated by the arrows.

FIG. 3 is an isometric illustration, somewhat enlarged, of the section as set forth in FIG. 1 of the pouch in an opened orientation relative to the flexible member.

FIG. 4 is an orthographic cross-sectional detailed view of the trough of the instant invention.

DESCRIPTION OF THE PREFERRED EMBODIMENT

With reference now to the drawings, and in particular to FIGS. 1 to 3 thereof, a new and improved battery blanket device embodying the principles and concepts of the present invention and generally designated by the reference numeral 10 will be described.

More specifically, it will be noted that the battery blanket device 10 essentially comprises a flexible exterior layer 12 of a non-porous polymeric material for securement about an associated battery 11. The exterior layer 12 includes a top edge 12a parallel to a bottom edge 12b. A first free end 13 is contiguously positioned adjacent a second free end 14 when the device 10 is secured about the battery 11. The first free end 13 includes a first hook and loop fastener strap 15 securable to a companion hook and loop fastener patch 16.

A single elongate flexible cup-shaped trough coextensively formed to the top edge 12a of the exterior layer 12 is formed of a memory retentent material formed with downwardly extending openings 19 to direct an acid neutralizing solution downwardly onto a porous sponge-like pad 20 of generally convex configuration extending interiorly of the exterior layer 12 and laminated coextensively to the interior surface of the exterior layer to impart frictional contact with the associated battery 11 when the porous pad 10 is compressingly secured to the exterior surface of the battery 11. The porous pad 20 is formed with a ribbed grasping surface 21 to enhance frictional contact with the surface of the battery 11.

A pocket 22 is fixedly secured to an exterior surface of the exterior layer 12 formed with a covering flap 23 including a flap connector pad 24 having third hook and loop fastener portions formed thereon securable to a pocket pad 25 including fourth hook and loop fastener portions for engagement with the flap connector pad 24. A fluid container 26 is thereby securable within the pocket 22 containing an acid neutralizing solution therein.

In use, the fluid container 26 is removed from the pocket 22 and the acid neutralizing solution contained therewithin is poured into the cup-shaped trough 17. The solution thereafter is directed downwardly through the through-extending openings 19 within the trough and thereby saturates the convex porous pad 20 for application to the exterior surface of the battery to minimize acid build-up thereon.

The polymeric exterior layer 12 in conjunction with the porous pad 20 also presents an insulating barrier to extremes of heat and the like associated within an engine compartment, as typically found in an automotive environment.

As to the manner of usage and operation of the instant invention, the same should be apparent from the above description and accordingly no further discussion relative to the manner of usage and operation of the instant invention shall be provided.

With respect to the above description then, it is to be realized that the optimum dimentional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A battery blanket device for securement about a battery comprising, in combination,
a battery, and
an elongate flexible exterior layer including a top edge, a bottom edge, a first end, and a parallel second end wherein said first and second end are in a contiguous adjacent relationship in securement of said device about said battery, and securement means for tautly securing said first end relative to said second end, and a dispensing member laminated to an interior surface of said exterior layer, and applicator means formed integrally to said top edge for directing an acid neutralizing fluid to said dispenser member.

2. A battery blanket device as set forth in claim 1 further comprising a pocket integrally secured to an exterior surface of said exterior layer including a flap comprising hook and loop fasteners for securing association with hook and loop fasteners formed on said pocket, and a container including an acid neutralizing solution therewithin securably contained within said pocket.

3. A battery blanket device as set forth in claim 2 wherein said dispensing member comprises a convex compressible porous member coextensively laminated to an interior surface of said exterior layer.

4. A battery blanket device as set forth in claim 3 wherein said dispensing member further includes a ribbed surface for frictional engagement with said battery.

5. A battery blanket device as set forth in claim 4 wherein said securement means includes a strap including first hook and loop fasteners integrally secured to said first end for cooperation with a connector pad integrally formed onto an exterior surface adjacent said second end.

6. A battery blanket device as set forth in claim 5 wherein said applicator means comprises a cup-shaped trough coextensive with said top edge and further including through-extending openings longitudinally formed through said trough for dispensing said neutralizing fluid to said dispensing member.

7. A battery blanket device as set forth in claim 6 wherein said cup-shaped trough is formed of a flexible memory retentent material to enable said trough and said battery blanket device to accommodate a plurality of configurations of said battery.

* * * * *